US012804025B1

(12) United States Patent
Lubbehusen et al.

(10) Patent No.: US 12,804,025 B1
(45) Date of Patent: Nov. 17, 2026

(54) INMATE COMMUNICATION SYSTEM WITH FLEXIBLE VIDEO VISITATION SCHEDULING FEATURE

(71) Applicant: CONFINEMENT TELEPHONY TECHNOLOGY, LLC, Greensboro, NC (US)

(72) Inventors: Rick Allen Lubbehusen, Winston-Salem, NC (US); John Vincent Townsend, III, Kernersville, NC (US); Timothy Edwin Pabon, Greensboro, NC (US); Shannon Neil Simpson, Winston-Salem, NC (US)

(73) Assignee: CONFINEMENT TELEPHONY TECHNOLOGY, LLC, Greensboro, NC (US)

( * ) Notice: Subject to any disclaimer, the term of this patent is extended or adjusted under 35 U.S.C. 154(b) by 0 days.

(21) Appl. No.: 19/250,358

(22) Filed: Jun. 26, 2025

Related U.S. Application Data

(63) Continuation of application No. 18/417,412, filed on Jan. 19, 2024, now Pat. No. 12,375,539.
(Continued)

(51) Int. Cl.
*H04L 65/403* (2022.01)
*G06Q 10/1093* (2023.01)
(Continued)

(52) U.S. Cl.
CPC ....... *H04L 65/403* (2013.01); *G06Q 10/1093* (2013.01); *G06Q 20/22* (2013.01); *G06Q 30/0283* (2013.01); *H04W 4/14* (2013.01)

(58) Field of Classification Search
CPC ............... H04L 65/403; H04L 65/1069; H04L 65/1096; G06Q 10/1093; G06Q 20/22; G06Q 30/0283; H04W 4/14; H05N 7/14
(Continued)

(56) References Cited

U.S. PATENT DOCUMENTS 5,926,533 A 7/1999 Gainsboro
7,046,779 B2 5/2006 Hesse
(Continued)

FOREIGN PATENT DOCUMENTS

CN 101511001 A 8/2009
CN 201374782 Y 12/2009
(Continued)

OTHER PUBLICATIONS

Coldewey, David, "Ameelio's free calling service for inmates goes live at first facilities", https://techcrunch.com/2021/12/20/ameelios-free-video-calling-for-inmates-2022-launch/ (2021) 2021.
(Continued)

*Primary Examiner* — Jude Jean Gilles
(74) *Attorney, Agent, or Firm* — Thompson Hine LLP

(57) ABSTRACT

Some implementations enable an inmate communication session without requiring a call be accepted. An inmate initiates a request that is sent to a non-inmate. The request may request that the non-inmate participate in a future communication session. The non-inmate at some point (potentially long after receiving the request), responds to the request by providing input on their device. A scheduling device, in accordance with receiving a response from the second device in response to the request, schedules the communication session at a future time and notifies the inmate and non-inmate of scheduling of the communication session. At the future time, the scheduling device triggers creation of a virtual conference room. In response to a first message from an inmate device, the inmate device is joined to the virtual conference and, in response to a second message from a non-inmate device, the non-inmate device is joined to the virtual conference.

30 Claims, 6 Drawing Sheets

Related U.S. Application Data

(60) Provisional application No. 63/440,150, filed on Jan. 20, 2023.

(51) Int. Cl.
*G06Q 20/22* (2012.01)
*G06Q 30/0283* (2023.01)
*H04W 4/14* (2009.01)

(58) Field of Classification Search
USPC .......................................................... 709/204
See application file for complete search history.

(56) References Cited

U.S. PATENT DOCUMENTS

| | | | |
|---|---|---|---|
| 7,106,843 B1 | 9/2006 | Gainsboro | |
| 7,248,680 B1 | 7/2007 | Gainsboro | |
| 7,529,357 B1 | 5/2009 | Rae | |
| 7,860,222 B1 | 12/2010 | Sidler | |
| 7,881,446 B1 | 2/2011 | Apple | |
| 7,899,167 B1 | 3/2011 | Rae | |
| 8,000,269 B1 | 8/2011 | Rae | |
| 8,031,850 B2 | 10/2011 | Polozola et al. | |
| 8,340,260 B1 | 12/2012 | Rae | |
| 8,498,937 B1 | 7/2013 | Shipman, Jr. et al. | |
| 8,654,956 B2 | 2/2014 | Ryan, III | |
| 8,750,486 B1 | 6/2014 | Keiser | |
| 8,798,035 B1 | 8/2014 | Passe | |
| 8,811,582 B1 | 8/2014 | Torgersrud | |
| 9,094,500 B1 | 7/2015 | Edwards | |
| 9,094,569 B1 | 7/2015 | Humphries | |
| 9,106,789 B1 | 8/2015 | Shipman, Jr. et al. | |
| 9,124,763 B2 | 9/2015 | Humphries | |
| 9,232,051 B2 | 1/2016 | Torgersrud | |
| 9,300,791 B1 | 3/2016 | Higgs | |
| 9,609,269 B2 | 3/2017 | Humphries | |
| 9,614,974 B1 | 4/2017 | Hodge | |
| 9,723,040 B1 | 8/2017 | Lubbehusen | |
| 9,723,262 B1 * | 8/2017 | Humphries | G06Q 20/02 |
| 9,800,830 B2 | 10/2017 | Humphries | |
| 9,826,003 B1 | 11/2017 | Thomasson | |
| 9,832,313 B1 | 11/2017 | Way | |
| 9,832,318 B1 | 11/2017 | Smith | |
| 9,992,330 B1 | 6/2018 | Hodge | |
| 10,050,668 B1 | 8/2018 | Keiser | |
| 10,313,632 B2 | 6/2019 | Humphries | |
| 10,412,125 B2 | 9/2019 | Thomasson | |
| 10,666,899 B2 | 5/2020 | Humphries | |
| 10,701,314 B2 | 6/2020 | Humphries | |
| 10,708,419 B1 | 7/2020 | Talbot | |
| 10,728,290 B1 | 7/2020 | Thomasson | |
| 10,785,446 B2 | 9/2020 | Humphries | |
| 10,904,297 B1 | 1/2021 | Parampottil | |
| 10,944,803 B1 | 3/2021 | Johnston, Jr. | |
| 11,075,964 B1 | 7/2021 | Thomasson | |
| 11,258,981 B2 | 2/2022 | Humphries | |
| 11,265,511 B2 | 3/2022 | Humphries | |
| 11,854,105 B2 * | 12/2023 | Hodge | G06Q 50/26 |
| 11,856,325 B2 * | 12/2023 | Humphries | H04L 65/1096 |
| 2003/0174826 A1 | 9/2003 | Hesse | |
| 2005/0084086 A1 | 4/2005 | Hesse | |
| 2005/0114192 A1 * | 5/2005 | Tor | G06Q 10/109 705/80 |
| 2005/0254440 A1 | 11/2005 | Sorrell | |
| 2006/0087555 A1 | 4/2006 | Boyd | |
| 2006/0271400 A1 | 11/2006 | Clements et al. | |
| 2007/0071206 A1 * | 3/2007 | Gainsboro | H04M 3/42221 379/168 |
| 2007/0285504 A1 | 12/2007 | Hesse | |
| 2008/0201158 A1 | 8/2008 | Johnson | |
| 2009/0067504 A1 | 3/2009 | Zheludkov | |
| 2009/0067604 A1 | 3/2009 | Apple | |
| 2009/0207987 A1 | 8/2009 | Ryan | |
| 2010/0191566 A1 | 7/2010 | Loring | |
| 2011/0047473 A1 | 2/2011 | Hanna | |
| 2011/0167078 A1 | 7/2011 | Benjamin | |
| 2012/0014517 A1 | 1/2012 | Orr | |
| 2012/0176466 A1 | 7/2012 | Wrench | |
| 2012/0204029 A1 | 8/2012 | Trabucco | |
| 2012/0281058 A1 * | 11/2012 | Laney | H04N 7/15 348/14.03 |
| 2013/0044867 A1 | 2/2013 | Walters | |
| 2013/0150004 A1 | 6/2013 | Rosen | |
| 2013/0152192 A1 | 6/2013 | Dischamp | |
| 2013/0179949 A1 | 7/2013 | Shapiro | |
| 2013/0194377 A1 | 8/2013 | Humphries | |
| 2013/0253339 A1 | 9/2013 | Reyes | |
| 2013/0263227 A1 | 10/2013 | Gongaware | |
| 2014/0192132 A1 | 7/2014 | Avery | |
| 2014/0266686 A1 | 9/2014 | Torgersrud et al. | |
| 2014/0267540 A1 | 9/2014 | Torgersrud | |
| 2014/0269366 A1 | 9/2014 | Togersrud | |
| 2014/0270126 A1 | 9/2014 | Torgersrud | |
| 2014/0273929 A1 | 9/2014 | Torgersrud | |
| 2014/0280632 A1 | 9/2014 | Torgersrud | |
| 2014/0313275 A1 | 10/2014 | Gupta | |
| 2014/0334610 A1 | 11/2014 | Hangsleben | |
| 2015/0319612 A1 | 11/2015 | Hodge | |
| 2016/0028786 A1 | 1/2016 | Hanna | |
| 2016/0239932 A1 | 8/2016 | Sidler | |
| 2017/0083878 A1 | 3/2017 | Conrad | |
| 2017/0094534 A1 | 3/2017 | Salyers | |
| 2017/0134468 A1 | 5/2017 | Togersrud | |
| 2017/0236228 A1 | 8/2017 | Hodge | |
| 2019/0297302 A1 | 9/2019 | Humphries | |
| 2021/0165662 A1 | 6/2021 | Qiao | |
| 2021/0361700 A1 | 11/2021 | Meydani | |

FOREIGN PATENT DOCUMENTS

| | | |
|---|---|---|
| CN | 101950383 A | 1/2011 |
| WO | 2006046956 A1 | 5/2006 |

OTHER PUBLICATIONS

Tartaro, Christine, "Inmate Visitation: Visitor Preferences Regarding the Best Visitation Modality for Children," Oct. 2016 Corrections 2(1): 1-21 (2017) 2017.

Tartaro, Christine, Visitation Modality Preferences for Adults Visiting Jails, The Prison Journal, pp. 1-23, 2017 2017.

* cited by examiner

FIG. 1A – INMATE JOHN DOE SENDS VISITATION REQUEST
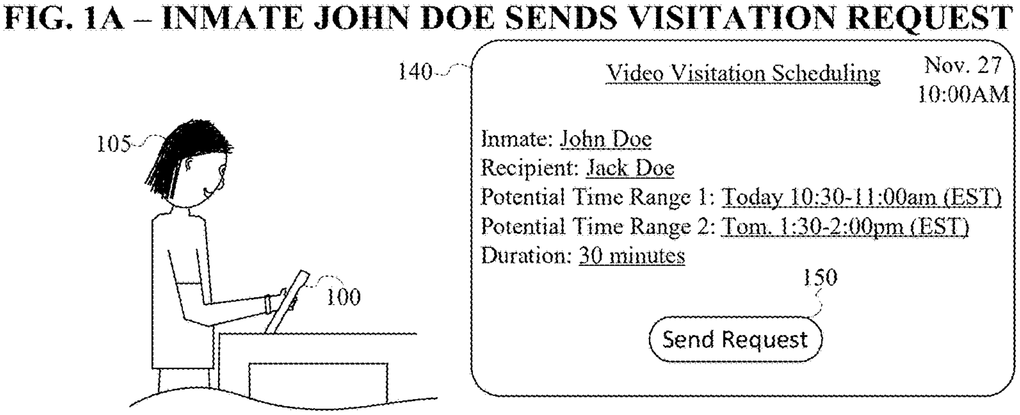
FIG. 1B – VISITOR JACK DOE RECEIVES VISITATION REQUEST, SELECTS A TIME, AND ACCEPTS
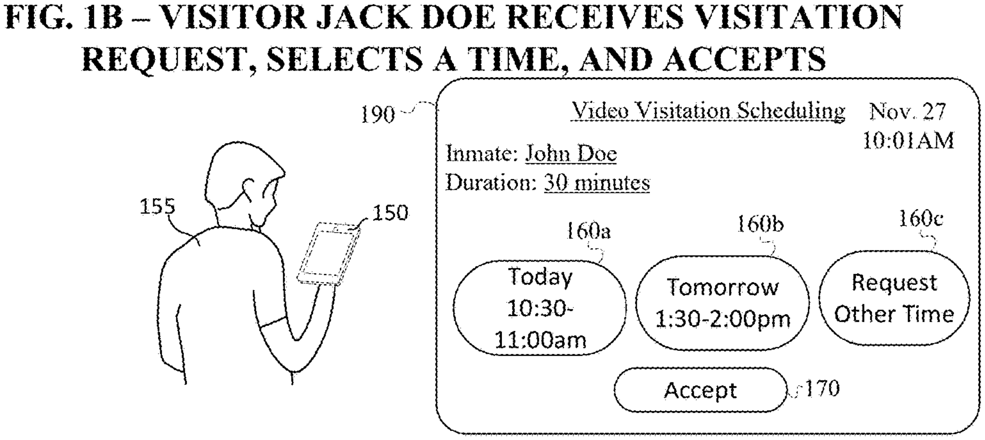
FIG. 1C – INMATE JOHN DOE RECEIVES SCHEDULING ACCEPTANCE
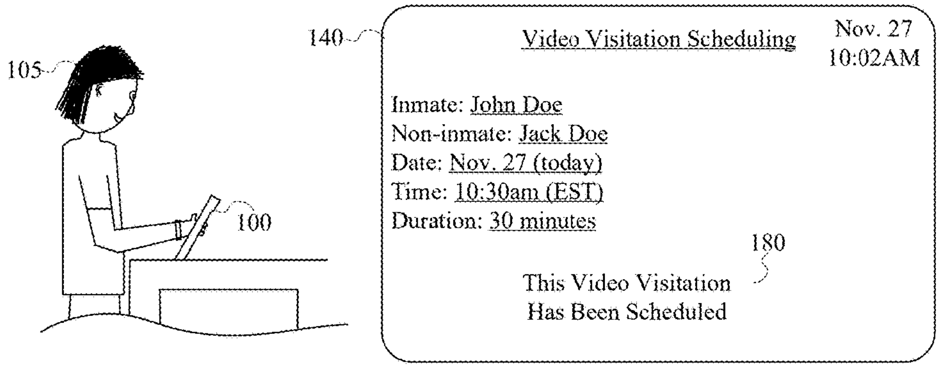

INMATE COMMUNICATION SYSTEM WITH FLEXIBLE VIDEO VISITATION SCHEDULING FEATURE

RELATED APPLICATIONS

This patent application is a continuation of U.S. patent application Ser. No. 18/417,412 filed on Jan. 19, 2024, which claims the benefit of U.S. Provisional Application No. 63/440,150 entitled "Inmate Communication System with Call-Me-Back Feature," filed on Jan. 20, 2023, which is incorporated herein by this reference in its entirety.

TECHNICAL FIELD

The present disclosure generally relates to communication systems and methods in which at least one of the participants is in a confinement institution such as a prison or jail.

BACKGROUND

Establishing video visitation sessions that involve participants in confinement institution can be problematic. Inmates may not have consistent access to communication devices or may have limited times at which communication sessions can be conducted. Participants outside of the confinement institution may also have schedule and communication device resource limitations. For these and other reasons, it may be desirable for such communication sessions to be initiated in non-traditional ways, e.g., without requiring a call be made by one participant and accepted by the other participant for a communication session to be established.

SUMMARY

Some implementations disclosed herein enable a communication session to be established in non-traditional ways, e.g., without requiring a call be made by one participant and accepted by the other participant for a communication session to be established. Some implementations facilitate scheduling of video visitation sessions that the participants will join at a scheduled time. In one example, an inmate participant initiates a request that is sent to a non-inmate participant. The request may request that the non-inmate participant participate in a future communication session. A scheduling device such as a server, for example, may receive a request initiated from a first device operated by an inmate of a confinement institution, the request directed to a non-inmate participant and requesting that the non-inmate participant respond to schedule a communication session. The scheduling device may transmit the request to a second device operated by the non-inmate participant. The non-inmate participant at some point (potentially minutes, hours, or even days after receiving the request), responds to the request by providing input on their device.

The scheduling device, in accordance with receiving a response from the second device in response to the request, schedules the communication session at a future time and notifies the inmate and non-inmate participant of the scheduling of the communication session. At the future time, the scheduling device triggers creation of a virtual conference room. In response to a first message from the first device (e.g., when the inmate selects a "join" user interface option), the first device is joined to the virtual conference room and, in response to a second message from the second device (e.g., when the non-inmate selects a "join" user interface option), the second device is joined to the virtual conference room. Audio and video are shared between the first device and the second device in the virtual conference room. The participants may join the virtual conference in any order, and may be notified when the other party has joined and is waiting. In some implementations, the virtual conference room is managed according to timing rules and/or criteria, e.g., remaining open for only a specified duration based on input provided by the inmate and/or non-inmate participant.

In some implementations, a virtual conference room provides a reservation of, or placeholder for, resources necessary to facilitate a unique video visit session. As examples, the resources could be a combination of the conference server itself, computing memory, database entries, storage locations for recordings, HTTP ports, HTTPS ports, WEBRTC ports, network connections, physical or virtual hardware. An Identifier may be assigned to associate incoming connections with the correct resources. Once resources are reserved or allocated the conference server may be configured to accept connections from parties, e.g., using the corresponding identifier.

In some implementations, a method is performed by a processor of a device (e.g., a communication/scheduling server). The method involves receiving a request initiated from a first device operated by an inmate of a confinement institution, the request directed to a non-inmate participant and requesting that the non-inmate participant respond to schedule a communication session. The method involves transmitting the request to second device operated by the non-inmate participant. In accordance with receiving a response from the second device in response to the request, the method involves scheduling the communication session at a future time and notifying the inmate and non-inmate participant of the scheduling of the communication session. The method involves, at the future time, triggering creation of a virtual conference room. The method involves, in response to a first message from an inmate device, joining the inmate device to the virtual conference room, and, in response to a second message from a non-inmate device, joining the non-inmate device to the virtual conference room, wherein audio and video are shared between the devices in the virtual conference room.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE FIGURES

These and other features, implementations, and advantages of the present disclosure are better understood when the following Detailed Description is read with reference to the accompanying drawings.

FIGS. 1A-C illustrate devices and user interfaces used in the scheduling of a video visitation, according to some implementations disclosed herein.

DETAILED DESCRIPTION

Figure 2:
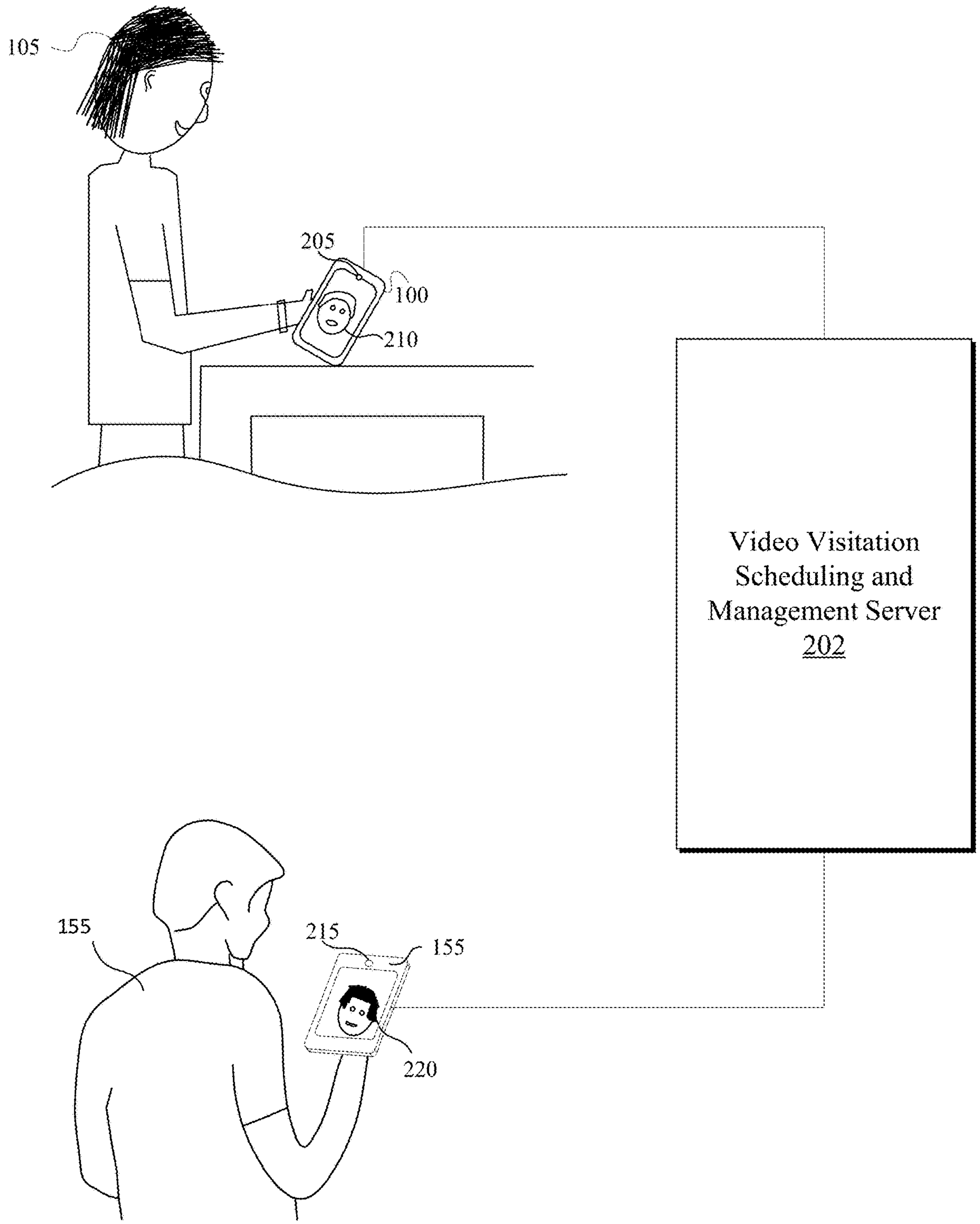
FIG. 2 illustrates an exemplary video visitation session, according to some implementation disclosed herein.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

In some implementations, an inmate will originate a request from a tablet or other mobile device that is sent to a remote party to schedule a visitation session. If the remote party is an approved party, they can be selected from the inmate's contact list. If the remote party is not an approved contact, the inmate can enter their information (e.g., name, phone number, etc.) to be approved, e.g., by an administrator or institution staff member. The inmate may select to pay for the visit or request the payment from the remote party. The contact list from which the remote party may be selected may be shared or created by one or more different applications such as text chat (messaging), or other applications which require the use of an approved remote party contact list.

If the remote party is not an approved contact, the remote party may be instructed (e.g., via phone call, text (SMS) message, app notification, etc.) to submit a request to become an approved contact. This approval may be manually approved by the institution staff. This approval may be based on a setting or process that enables automatic contact approval. Once approved, the remote party will be available for the inmate to request a video visit be scheduled by the remote party.

If the remote party is approved or is already an approved contact, they will receive visitation scheduling requests sent from the inmate. Such requests can be sent via an SMS text message, phone call, text chat (messaging) application, or app notifications, as examples. If an SMS message is sent, it may contain the inmate's name and institution from which the request came, and/or provide a link that will direct the remote party to the specific app or a web page (e.g., operated by a communications provider) to schedule the visitation session. Such an app or web page may enable the remote party to select from predetermined time periods, such as 5, 15, or 30 minutes from now or a specified time such as 10:30. The remote party may also be given the option to decline the request and/or block their number from receiving any future requests.

If a time period is selected by the remote party, a custom scheduling application (e.g., via communications with one or more devices at a communications provider's facility, data center, server, etc. or hosted by a cloud provider) may create a virtual conference room. The virtual conference room may be configured in way such that it will exist/remain open for the time period. Such a period of time may be selected by the remote party (or otherwise). The virtual conference room may be available for the inmate and/or remote party to join for the period of time. No video or audio may be established at this point.

The inmate and/or remote party may be enabled to join the virtual conference room at any time prior to the expiration of the virtual conference room.

A notification will let the inmate or remote party know when the other party has joined the virtual conference room. This may trigger an extension or reset of the expiration time to allow the inmate or remote party more time to join.

Once both parties have joined the virtual conference room, the virtual conference room expiration may be reset or extended, e.g., to the maximum number of minutes allowed for a video visit, and the video and audio will be established between the parties.

Once the audio and video have been established, if either party ends the visit and/or the maximum allowed number of minutes have elapsed, the video and audio will be stopped for both parties and the virtual conference room will be removed/deleted/destroyed.

Example

1. Inmate request.
2. Remote party selects a time period within which they will be available (e.g., 11:00 am today for 15 minutes)
3. At or around the scheduled time, the scheduling application creates the virtual conference room (e.g., conference room created at 11:00 to expire at 11:15)
4. Sometime between during the conference room open window (e.g., 11:00 to 11:15) the remote party and/or inmate may join the virtual conference.
5. One party joins the conference room (e.g., the remote party joins the virtual conference room at 11:13)
6. The virtual conference room may extend the expiration for an extension period (e.g., extending 5 minutes from the time one party joined to expire at 11:18)
7. The other party joins the virtual conference room during the extension period (e.g., the inmate joins at 11:16)
8. A maximum allowed visit may be set (e.g., 15 minutes)
9. The virtual conference room expiration is set (e.g., the conference room will now expire at 11:31 or if either party ends the visit)
10. Audio and video are established.
11. The visit continues until 11:31
12. Audio and video are stopped.
13. The virtual conference room is removed/deleted/destroyed.

FIG. 1A illustrates an exemplary device 100 providing a user interface 140 within a confinement institution. In this example, user 105 uses device 100 to access a user interface 140. In this example, the device 100 is a hand-held device such as a tablet computing device. However other types of devices including mobile devices of other types, laptop computers, desktop computers, etc. may be used by the inmate. The device 100 includes sensors and/or input devices (e.g., camera, a phone headset, a touch screen, a keyboard, a mouse etc.) to receive information and/or output devices such as one or more displays and/or speakers. The device 100 presents a user interface 140 to user 105. The displayed aspect of the user interface 140 includes a video visitation scheduling interface that enables the user 105 to schedule a video visitation session for a time in the future. The user does so, in the example, by making one or more selections on the user interface 140, e.g., identifying the inmate's identity or name (e.g., John Doe) and identifying a recipient (e.g., Jack Doe) of a request to schedule an interview, i.e., the non-inmate who will participate in the session.

The inmate (e.g., user 105) may specify one or more potential dates/times for a requested video visitation session. In this example, the inmate has specified a first potential time range (today 10:30-11:00 am (EST)) and a second potential time range (tomorrow 1:30-2:00 pm (EST)). In this example, the time ranges specify the visit duration (e.g., 30 minutes). In alternative implementations, the inmate may separately provide input selecting a desired maximum visit length. The potential time ranges selected by the inmate (e.g., user 105) may be limited based on the inmate's and/or the confinement facility's schedule. The potential time ranges selected by the inmate (e.g., user 105) may be limited based on the availability of a device for the inmate to use to participate in the visit at a given time.

The user 105 may provide these input selections by entering text, selecting from drop down lists of available options, or via any other user interface mechanism. After inputting the video visitation session parameters, the user selects the send request option 150 to send the request for the video visitation scheduling to the specified remote party (i.e., non-inmate) recipient.

FIG. 1B illustrates an exemplary device 150 providing a user interface 140 to a non-inmate who receives a request to schedule a video visitation session from an inmate, e.g., who receives a request sent based on the exemplary user actions of FIG. 1A. In this example of FIG. 1B, user 155 uses device 150 to access a user interface 190. In this example, the device 150 is a hand-held device such as a tablet. However other types of devices including mobile devices, laptop computers, desktop computers, etc. may be used by the non-inmate. The device 150 includes sensors and/or input devices (e.g., camera, a phone headset, a touch screen, a keyboard, a mouse etc.) to receive information and/or output devices such as one or more displays and/or speakers. The device 150 presents a user interface 190 to user 155. The displayed aspect of the user interface 190 includes a video visitation scheduling interface that enables the user 155 to accept (or reject or modify) a request to schedule a video visitation session. The user 155 does so, in the example, by viewing the proposed video visitation session in the user interface 190, selecting a time range option, and selecting the accept option 170. In this example, the time range options are based on the information in the request, e.g., the inmate request specified a first potential time range (today 10:30-11:00 am (EST)) (option A 160*a*) and a second potential time range (tomorrow 1:30-2:00 pm (EST) (option B 160B). A third option (option C 160*c*) is also presented that the user 155 may select to specify a time that is different than one of the time ranges proposed in the request. If this option (option C 160C) is selected, then the inmate may be contacted to confirm that the different time range is acceptable prior to scheduling the video visitation session. The user 155 selects the accept option 170 to accept the scheduling of the visitation session with the specified parameters.

FIG. 1C illustrates the user interface 140 (of FIG. 1A) showing the inmate 105 a message 180 indicating that the video visitation session has been scheduled. Such a message 180 may be shown, for example, in response to the system receiving an acceptance of the session by the user 155 of FIG. 2 accepting the request via accept option 170. Both users may be notified of the scheduled video visitation session and reminders added to the users' respective calendars and/or upcoming video visitation lists.

In some implementations, a video visitation session is scheduled as soon as possible, e.g., based on input from one or both of the users 100, 105. Such scheduling may set a time range for the video conference that will begin shortly in the future (e.g., 30 seconds from now, 1 minute from now, 5 minutes from now, etc.).

In some implementations, multiple video visitation sessions are scheduled at once. For example, a recurring video visitation session may be scheduled to recur weekly, monthly, etc., e.g., at 10:30 am every Tuesday.

In some implementations, the video visitation request may provide information about the expected topic of the video visitation session (e.g., legal issues, bills, upcoming court hearing, the inmate's children, etc.). In some implementations, a response to a visitation request may similarly provide information about the expected topic of the video visitation session.

FIG. 2 illustrates an exemplary video visitation session. In this example, the user 105 (inmate) uses device 100 to join a scheduled video visitation session that is initiated and provided by the video visitation scheduling and management server 202. The user 155 (non-inmate) uses device 150 to also join the scheduled video visitation session that is initiated and provided by the video visitation scheduling and management server 202. Once both users have joined the session, image data captured by sensor 205 and audio captured by a microphone on device 100 are shared, via the video visitation scheduling and management server, with the device 155, where the captured images (e.g., video) is displayed on the display 220 for the user 155 to view and the captured audio is presented (e.g., via a speaker). Similarly, image data captured by sensor 215 and audio captured by a microphone on device 150 are shared, via the video visitation scheduling and management server, with the device 100, where the captured images (e.g., video) is displayed on the display 210 for the user 105 to view and the captured audio is presented (e.g., via a speaker). The shared image data may be modified and/or limited, e.g., to only show the inmate and/or non-inmate respectively without showing background environment and/or other individuals in the background. The image data and/or audio data may additionally or alternatively be modified to filter inappropriate or prohibited items (e.g., nudity, vulgarity, threatening words, etc.).

Figure 3:
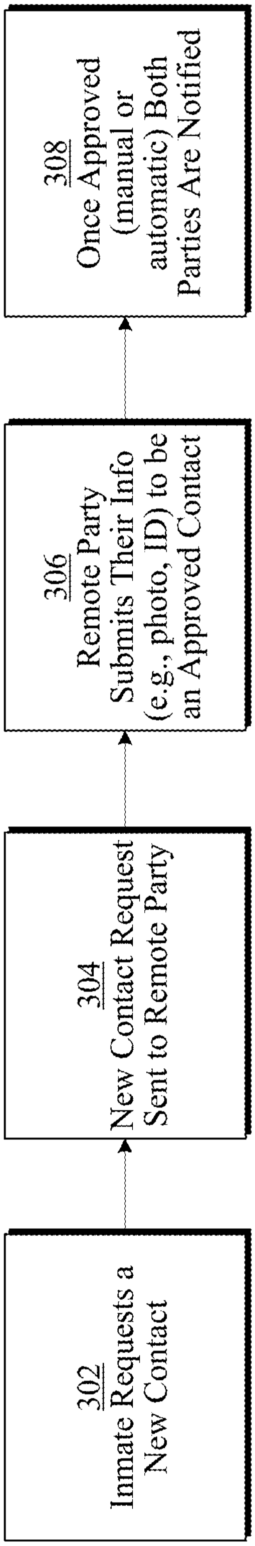
FIG. 3 illustrates an exemplary remote party approval process, according to some implementations disclosed herein.

FIG. 3 illustrates an exemplary remote party approval process. In this example, the inmate requests a new contact as shown in block 302. The request may identify the new contact and provide information about them including, but not limited to, name, driver's license number, residence information, telephone number information, e-mail address information, etc. Such a request may be made via a user interface provided on an inmate device such as a tablet or kiosk. A new contact request user interface may be provided as an option within a video visitation system, e.g., along with other options for scheduling, modifying, and/or participating in video visitation sessions. After the inmate requests a new contact (block 302), a new contact request is sent to the remote party (i.e., the non-inmate) as shown in block 304. Such a request may be provided to the potential new contact via a user interface provided on a device such as a tablet or kiosk. The user interface may ask the potential new contact to verify the accuracy of their information and/or to provide additional information. In block 306, the remote party (i.e., potential new contact) submits their info (e.g., photo, ID, etc.) in order to become an approved contact of the inmate. At block 308, once approved (e.g., manually by facility personnel or automatically) both parties are notified of the approval.

Figure 4:
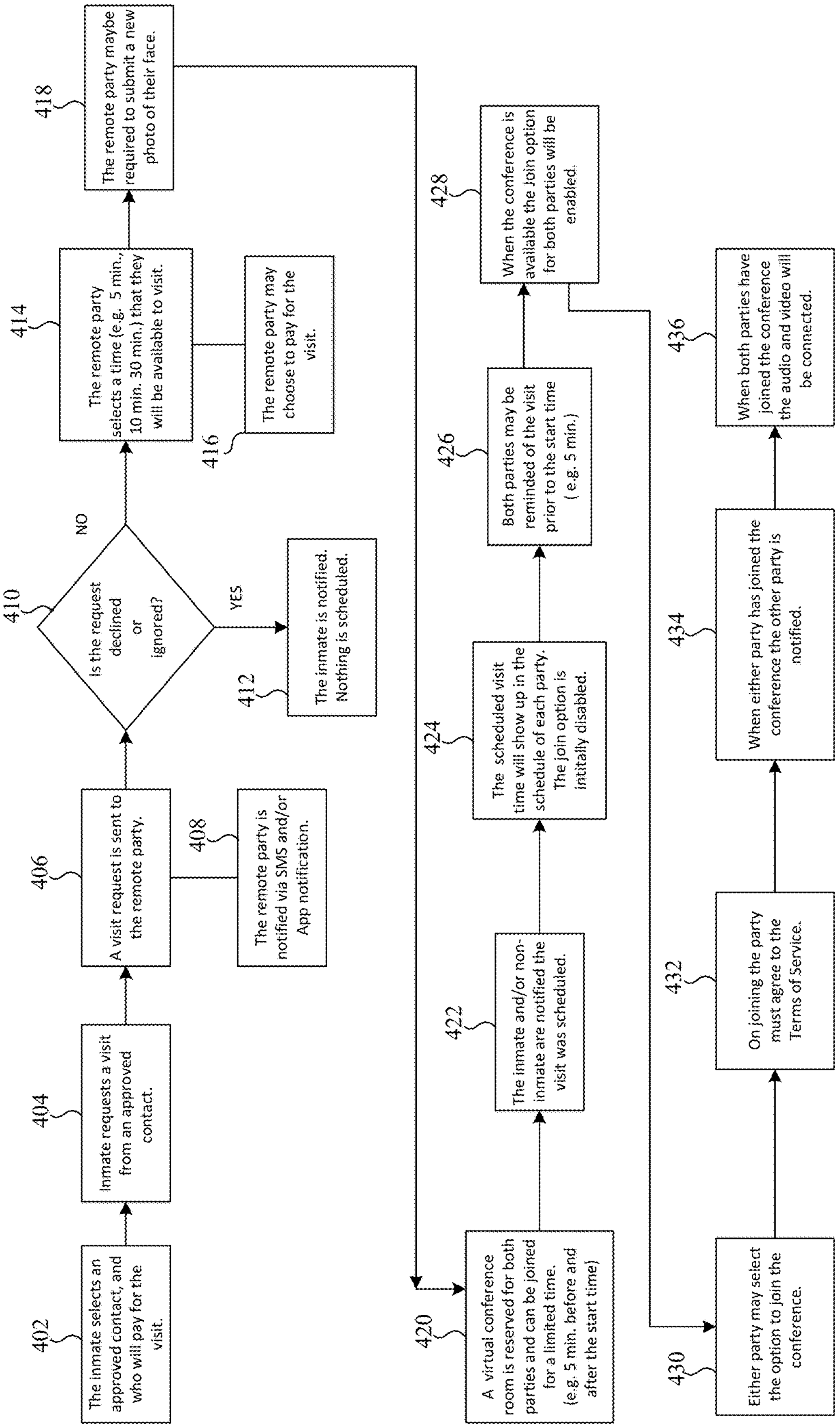
FIG. 4 illustrates exemplary video visitation scheduling and video visitation session conducting process, according to some implementations disclosed herein.

FIG. 4 illustrates an exemplary video visitation scheduling and conducting process. The process of FIG. 4 may, but need not, follow after the process of FIG. 3. In FIG. 4, at block 402, the inmate selects an approved contact, and who will pay for the visit. At block 404, the inmate requests a visit from the approved contact. A visit request is sent to the remote party at block 406 and the remote party is notified (e.g., via SMS and/or app notification) at block 408. The process determines if the request is declined or ignored at block 410. If the request is declined or ignored, the inmate is notified and nothing is scheduled, as shown at block 412.

In response to the request, the remote party may select a time (e.g., a duration, start time, time range, etc.) that they will be available to visit. Such a time selection may be based on one or more times (e.g., time ranges, start times, durations, etc.) proposed by the inmate in the original request (as described with respect to FIG. 1) or may be specified by the non-inmate as new proposed times. The remote party may choose to pay of the visit and/or supply payment information, as illustrated in block 416. The remote party may be required to submit additional information such as a new photo of their face, as shown in block 418.

Once the remote party accepts the request and/or the inmate accepts any modifications (e.g., new time info), the video visitation session is scheduled. A virtual conference room may be reserved for both parties and, once initiated, can be joined for a limited time (e.g., 5 minutes before and/or after the start time) as shown in block 420. The inmate and/or non-inmate may be notified that the visit is scheduled, as shown in block 422. The scheduled visit time may show up in the schedule of upcoming visits and/or calendar of each party and a "join" option (or the like) may initially be disabled, as shown in block 424. Both parties may be reminded of the visit prior to the start time (e.g., via SMS messages and/or app notifications provided 5 minutes prior to the start time), as shown in block 426. When the conference is available (e.g., after being initiated), the join option for both parties may be enabled, i.e., selectable, usable, visually altered to indicate the join option is now active, etc., as shown in block 428.

Once the conference is available (e.g., initiated), either party may select the option to join the conference on their respective devices, as illustrated in block 430. On joining, the parties may be required to agree to terms of service and/or verify identity or payment information, as shown in block 432. When either party has joined the conference, the other party may be notified, as shown in block 434. When both parties have joined the conference, the audio and/or video is connected, as shown in block 436.

Figure 5:
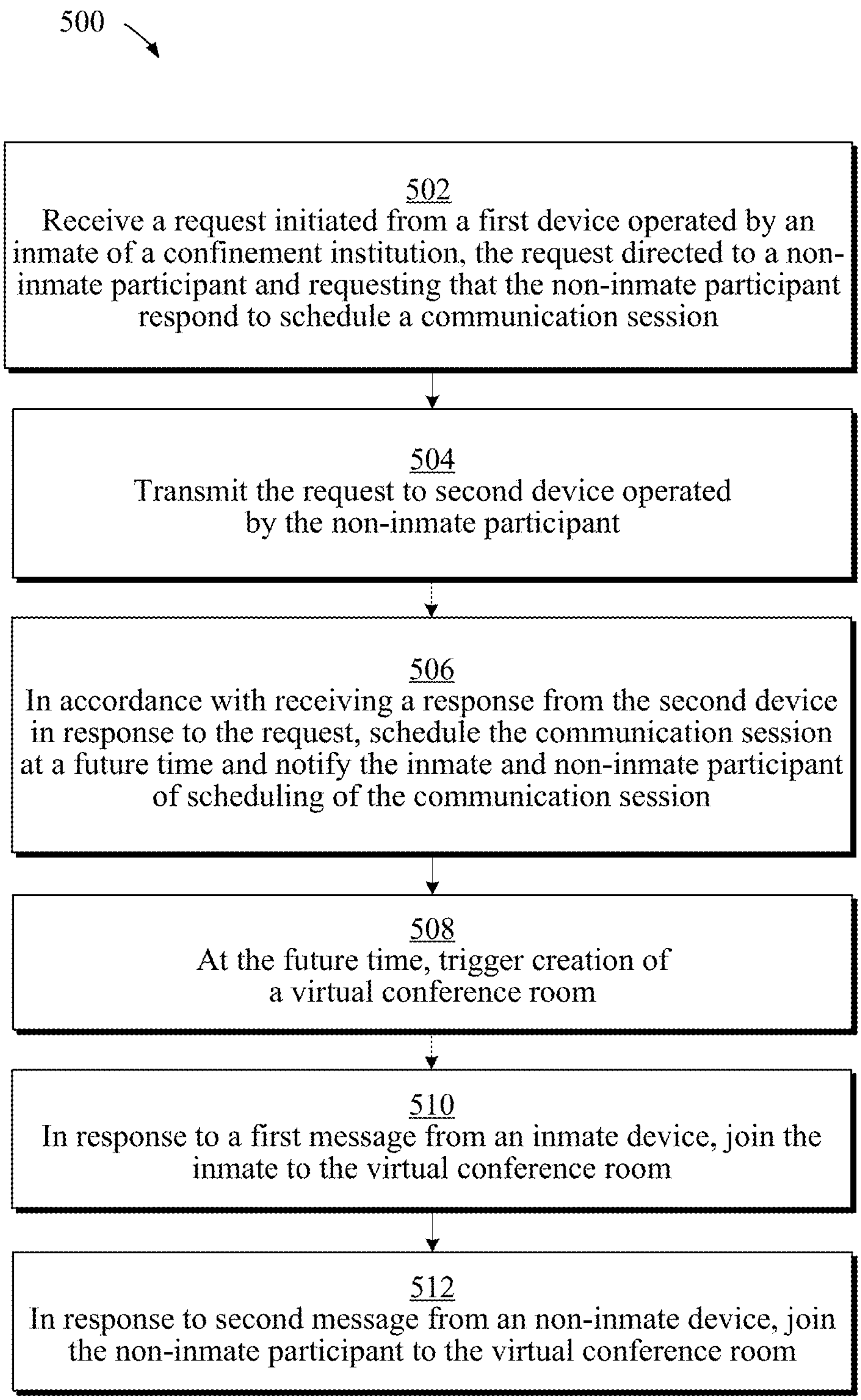
FIG. 5 illustrates an exemplary method for establishing and conducting a virtual visitation session, according to some implementations disclosed herein.

FIG. 5 illustrates an exemplary method 500 for establishing and conducting a virtual visitation session. The method 500 can be implemented via a computing device, for example, by a server or personal computing device storing and using a processor to execute instructions in a non-transitory computer-readable medium. Reference to the method being performed by a computing device includes the method being performed by one or more computing devices and/or using one or more processors.

The method 500 involves, at block 502, involves receiving a request initiated from a first device operated by an inmate of a confinement institution, the request directed to a non-inmate participant and requesting that the non-inmate participant respond to schedule a communication session. The request may be based on receiving, at the first device, input selecting one or more time ranges for the communication session. The request may be based on receiving, at the first device: input selecting an approved contact; and input requesting a video visit to be scheduled.

The method 500, at block 504, involves transmitting the request to second device operated by the non-inmate participant. Transmitting the request may comprise sending a short-message-service (SMS) message or app notification that is received by the second device.

The method 500, at block 506, involves, in accordance with receiving a response from the second device in response to the request, scheduling the communication session at a future time and notifying the inmate and non-inmate participant of scheduling of the communication session. The response may be based on receiving, at the second device, input selecting one or more time ranges for the communication session. The future time may be a specified number of minutes from a current time, e.g., five minutes from a current time, one minute from a current time, etc., or a specified time, e.g., 10:30 am EST. The response may be based on receiving, at the second device: input selecting a time or time period; and/or input selecting to pay for the communication session. The response may be based on receiving, at the second device input providing a photograph of the non-inmate participant.

The method 500, at block 508, involves, at the future time (e.g., around the time, for example, 5 minutes before), triggering creation of a virtual conference room. The virtual conference room may be made available to be joined by the inmate and non-inmate participant for a limited time having a predetermined length. Join features for joining the communication session may be visible but disabled prior to the creation of the virtual conference room and then visible and enabled after the creation of the virtual conference room.

The method 500, at block 510, involves in response to a first message from an inmate device, joining an inmate device to the virtual conference room. The inmate device may be the first device (e.g., the same device used by the inmate to schedule the visit) or a third device different than the first device (e.g., a different device than was used by the inmate to schedule the visit). The method 500, at block 512, involves, in response to a second message from the second device, joining a non-inmate device to the virtual conference room. The non-inmate device may be the second device (e.g., the same device used by the inmate to schedule the visit) or a third device different than the first device (e.g., a different device than was used by the inmate to schedule the visit).

When the inmate device is joined to the virtual conference room, the non-inmate participant may be notified of the inmate joining the virtual conference room. Similarly, when the non-inmate device is joined to the virtual conference room, the inmate is notified of the non-inmate participant joining the virtual conference room.

Once both inmate and non-inmate have joined, audio and video are shared in the virtual conference room. A charge for the communication session may be determined based on an amount of time that both the first device and second device are concurrently joined to the virtual conference room.

Exemplary System

Figure 6:
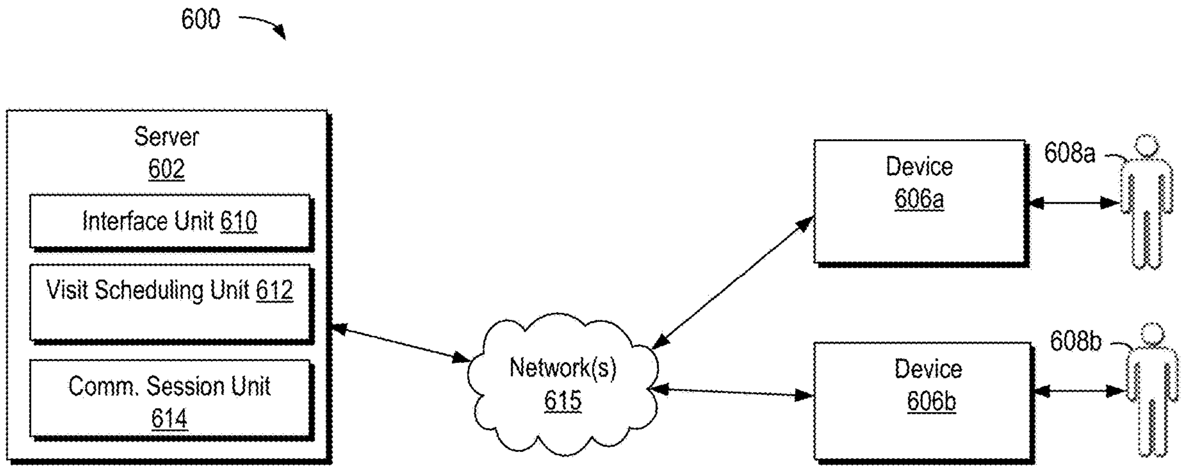
FIG. 6 is a block diagram of a computing environment in which one or more implementations of the invention can be practiced.

FIG. 6 is a diagram of an environment in which one or more implementations of the present disclosure can be practiced. The system configuration of FIG. 6 is provided as one example of a system configuration. In a particular implementation, devices and the communications between them as well as the allocation of functionality amongst the multiple devices involved can be configured differently depending upon the particular circumstances of the implementation.

In FIG. 6, there is a server 602 and user devices 606*a* and 606*b* used by persons 608*a* and 608*b*, who may be inmates or non-inmates. These devices 602 and 606*a-b* may be configured to communicate with one another via network 615. For example, the user devices 606*a-b* can be configured with apps (e.g., a web browser or a specialized app) for communicating with one another and with server 602. The apps can additionally or alternatively include calling/messaging functionality enabling the inmates to schedule video visitation sessions, participate in video visitation sessions, send messages, receive messages, and for other purposes related to communications with and information about the inmates, non-inmates, and the institution. The apps can include software modules that facilitate the monitoring of video visitation session, messages, music, content, and/or the information that is accessed via and/or stored on the user devices 606*a-b*. The apps can include software modules that monitor the devices to ensure that inmates are not able to use the devices and/or communications functionalities for prohibited purposes.

The server 602 may provide or make available education courses, entertainment, and other content. Such content may include, but are not limited to, files having images, videos, text, audio, slides, presentations, other types of electronic content and/or combinations of types of electronic content. Courses may be accessed for viewing/use by inmates (or released inmates) on the devices 606*a-b*. The content can include user interface features specific to particular courses or other content, functions for determining related content, and/or other functions useful in monitoring content provided via the devices 606*a-b*. The server 602 and/or user devices 606*a-b* may additionally or alternatively enforce configurable parameters, e.g., time limits, engagement tracking, etc.

The server 602 may include an interface unit 610 that provides information for user interface provided on device 606*a-b*, a visit scheduling unit 612 configured to receive information, e.g., form devices 606*a-b*, to schedule video visitations sessions, and/or a communication session unit 614 configured to establish video visitation sessions, enable participants to join such sessions, monitor such sessions, and/or charge for such sessions, and/or perform any other management tasks associated with managing video visitation session involving inmates of a confinement institution.

Figure 7:
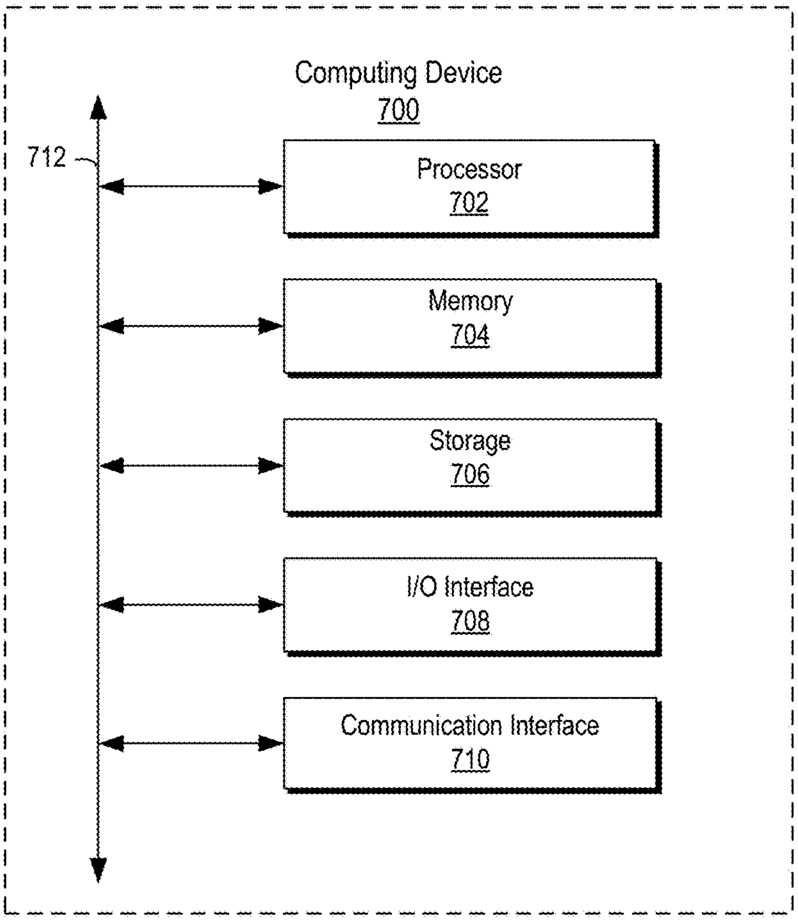
FIG. 7 is a block diagram depicting an example hardware implementation.

FIG. 7 is a block diagram depicting an example hardware implementation for the servers and devices described in FIG. 6. Each such device 700 may include a processor 702 that is communicatively coupled to memory 704 and storage 706 and that executes computer-executable program code and/or access information stored in the memory 704 and storage 706. The processor 702 may comprise a microprocessor, an application-specific integrated circuit ("ASIC"), a state machine, or other processing device. The processor 702 can include any of a number of processing devices, including just a single processing unit. Such a processor 702 can include or may be in communication with a computer-readable medium storing instructions that, when executed by the processor, cause the processor to perform the operations described herein.

The memory 704 and storage 706 can include any suitable computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, and ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++ C#, Visual Basic, Java, Python, Perl, and JavaScript.

The device 700 may also comprise a number of external or internal devices such as input or output devices. For example, the device 700 may have input/output ("I/O") interface 708 that can receive input from input devices or provide output to output devices. A bus 712 can also be included in the device 700. The bus 712 can communicatively couple one or more components.

The device 700 can also include at least one network interface device or other communication interface 710. The communication interface 700 can include any device or group of devices suitable for establishing a wired or wireless data or telephone connection to one or more networks. Non-limiting examples of a network interface device include an Ethernet network adapter, a modem, and/or the like. A device can transmit messages as electronic or optical signals.

An electronic device can be a computer, a kiosk, a telephone, a mobile device, a tablet, a smart phone, a smart watch, or any other communications device. A device can include a processor, memory, a bus, input/output components, network interface components, and other appropriate communication components. Non-limiting examples of input devices include a touch screen (e.g., one or more cameras for imaging a touch area or pressure sensors for detecting pressure change caused by a touch), a mouse, a keyboard, a camera, a microphone, or any other device that can be used to generate input events in response to actions by a user of a computing device. Input devices may include one or more cameras or other sensors that obtain information about the environment around the device. Non-limiting examples of output devices include an LCD screen, an external monitor, a speaker, or any other device that can be used to display or otherwise present outputs generated by a computing device. The device can execute program code that configures the processor to perform one or more of the operations described above.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not be described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general-purpose computing apparatus to a specialized computing apparatus implementing one or more Implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

The foregoing description and summary of the invention are to be understood as being in every respect illustrative and exemplary, but not restrictive, and the scope of the invention disclosed herein is not to be determined only from the detailed description of illustrative Implementations but according to the full breadth permitted by patent laws. It is to be understood that the Implementations shown and described herein are only illustrative of the principles of the present invention and that various modification may be implemented by those skilled in the art without departing from the scope and spirit of the invention.

What is claimed is:

1. A method, comprising:

at an electronic device having a processor:

receiving a request initiated from a first device operated by a non-inmate participant, the request directed to an inmate of a confinement institution and requesting that the inmate respond to schedule a communication session;

transmitting the request to a second device operated by the inmate;

in accordance with receiving a response from the second device in response to the request, scheduling the communication session at a future time and notifying the inmate and non-inmate participant of scheduling of the communication session;

at the future time, triggering creation of a virtual conference room prior to the inmate or non-inmate joining the virtual conference room;

after the creation of the virtual conference room and in response to a first message from an inmate device operated by the inmate, joining an inmate device to the virtual conference room; and after the creation of the virtual conference room and in response to a second message from a non-inmate device operated by the non-inmate participant, joining the non-inmate device to the virtual conference room, wherein audio and video are shared between the inmate device and the non-inmate device in the virtual conference room.

2. The method of claim 1, wherein the electronic device is a server.

3. The method of claim 1, wherein the request is based on receiving, at the second device, input selecting one or more time ranges for the communication session.

4. The method of claim 1, wherein the response is based on receiving, at the second device, input selecting one or more time ranges for the communication session.

5. The method of claim 1, wherein the future time is a specified number of minutes from a current time.

6. The method of claim 1, wherein the future time is five minutes from a current time.

7. The method of claim 1, wherein the future time is one minute from a current time.

8. The method of claim 1, wherein:

when the inmate device is joined to the virtual conference room, the non-inmate participant is notified of the inmate joining the virtual conference room; or when the non-inmate device is joined to the virtual conference room, the inmate is notified of the non-inmate participant joining the virtual conference room.

9. The method of claim 1 further comprising:

determining a charge for the communication session based on an amount of time that both the inmate device and the non-inmate device are concurrently joined to the virtual conference room.

10. The method of claim 1, wherein the request is based on receiving, at the first device:

input selecting the inmate; and input requesting a video visit to be scheduled.

11. The method of claim 1, wherein transmitting the request comprises sending a short-message-service (SMS) message or app notification that is received by the second device.

12. The method of claim 1, wherein the response is based on receiving, at the second device:

input selecting a time or time period; and input selecting to pay for the communication session.

13. The method of claim 1, wherein the response is based on receiving, at the second device:

input providing a photograph of the inmate.

14. The method of claim 1, wherein the virtual conference room is available to be joined by the inmate and non-inmate participant for a limited time having a predetermined length.

15. The method of claim 1, wherein a join option for the inmate or non-inmate to join the communication session is visible but disabled prior to the creation of the virtual conference room and visible and enabled after the creation of the virtual conference room such that the join option is only active after the virtual conference room is created.

16. The method of claim 1, wherein the non-inmate device joined to the virtual conference room is the first device used to schedule the communication session.

17. The method of claim 1, wherein the non-inmate device joined to the virtual conference room is different than the first device used to schedule the communication session.

18. The method of claim 1, wherein the inmate device joined to the virtual conference room is the second device used to schedule the communication session.

19. The method of claim 1, wherein the inmate device joined to the virtual conference room is different than the second device used to schedule the communication session.

20. The method of claim 1, further comprising requiring the inmate to provide identity verification upon joining and requiring the non-inmate to provide identity verification upon joining.

21. The method of claim 1, wherein both the inmate and non-inmate provide input selecting who pays for the communication session.

22. The method of claim 1 further comprising filtering inappropriate content during the communication.

23. The method of claim 1, wherein, upon creation, the virtual conference room provides:

a reservation of resources necessary for the communication session; or a placeholder for resources necessary for the communication session.

24. The method of claim 23, wherein the resources comprise a conference server or computer memory.

25. The method of claim 23, wherein the resources comprise storage locations for recordings.

26. The method of claim 23, wherein the resources comprise HTTP, HTTPS, or WEBRTC ports.

27. The method of claim 23, wherein the resources comprise network connections.

28. The method of claim 23, wherein the resources comprise physical or virtual hardware.

29. The method of claim 23, wherein, once resources are reserved or allocated, a conference server is configured to accept connections from the inmate and non-inmate using an identifier assigned to associate incoming connections with the resources.

30. A system comprising: memory; and one or more processors coupled to the memory, wherein the memory comprises program instructions that, when executed by the one or more processors, cause the system to perform operations comprising:

receiving a request initiated from a first device operated by a non-inmate participant, the request directed to an inmate of a confinement institution and requesting that the inmate respond to schedule a communication session;

transmitting the request to a second device operated by the inmate;

in accordance with receiving a response from the second device in response to the request, scheduling the communication session at a future time and notifying the inmate and non-inmate participant of scheduling of the communication session;

at the future time, triggering creation of a virtual conference room prior to the inmate or non-inmate joining the virtual conference room;

after the creation of the virtual conference room and in response to a first message from an inmate device operated by the inmate, joining an inmate device to the virtual conference room; and after the creation of the virtual conference room and in response to a second message from a non-inmate device operated by the non-inmate participant, joining the non-inmate device to the virtual conference room, wherein audio and video are shared between the inmate device and the non-inmate device in the virtual conference room.

* * * * *